United States Patent [19]
Favin et al.

[11] 3,731,194
[45] May 1, 1973

[54] AUTOMATIC TIME INTERVAL RANGING CIRCUIT FOR DELAY INTERVAL MEASUREMENTS INCLUDING UNCERTAINTY ELIMINATION

[75] Inventors: David Leonard Favin, Little Silver; Paul Jerry Snyder, Linden, both of N.J.

[73] Assignee: Bell Telephone Laboratories Incorporated, Murray Hill, Berkeley Heights, N.J.

[22] Filed: Nov. 10, 1971

[21] Appl. No.: 197,410

[52] U.S. Cl...................................324/186, 324/186
[51] Int. Cl................................................G04f 9/00
[58] Field of Search........................324/186, 115, 57

[56] References Cited

UNITED STATES PATENTS 3,271,666 9/1966 Anderson et al....................324/57 R

*Primary Examiner*—Alfred E. Smith
*Attorney*—R. J. Guenther et al.

[57] ABSTRACT

Delay time intervals are measured by employing a flip-flop circuit which is SET by a reference pulsating signal and RESET by a test pulse signal. A desired measurement precision is obtained by causing the flip-flop to be SET and RESET within the interval between adjacent pulses developed by a reference clock. This is achieved automatically by selectively shifting the phase of the reference pulsating signal waveform to delay SETTING of the flip-flop. The incremental shift in the reference signal waveform is directly related to the number of reference pulses occurring during the initial interval in which the flip-flop is SET and RESET. Uncertainty in automatic ranging is eliminated by selectively altering the pulse width of the test signal to assure that the flip-flop circuit is SET and RESET in a prescribed sequence.

12 Claims, 6 Drawing Figures

AUTOMATIC TIME INTERVAL RANGING CIRCUIT FOR DELAY INTERVAL MEASUREMENTS INCLUDING UNCERTAINTY ELIMINATION

BACKGROUND OF THE INVENTION

This invention relates to measurement systems and, more particularly, to time-interval measurement systems.

In order to maintain communication systems, for example, telephone trunks and the like, numerous measurements are made of system characteristics. Important among these is the measurement of envelope delay in telephone trunk systems. Envelope delay is determined by propagating a test signal through a system under test, for example, a telephone trunk, and then measuring the time interval between the occurrence of a predetermined phase position of the test signal and a reference pulse signal.

One such envelope delay measurement system is described in U. S. Pat. No. 3,271,666, issued to T.C.Anderson and D. L. Favin on Sept. 6, 1966. In that system, the time interval between the occurrence of the test signal and a reference pulse signal is measured by employing a bistable switching element. The bistable element responds to the test and reference signals to switch from a first stable state to a second stable state and then back to the first stable state.

A more precise time interval measurement is obtained in such a system by adjusting the system so that the bistable element indicates a measure only of intervals equal to or less than the interval between adjacent reference pulses. This is achieved in the system of U.S. Pat. No. 3,271,666 by employing a gate circuit which is controlled selectively to inhibit reference pulses from being supplied to the bistable element. A signal for controlling the gate circuit is generated by a monostable multivibrator having an adjustable unstable interval to provide known time internal ranges. In turn, the monostable multivibrator is triggered by a pulsating signal having a period equal to the test signal period. This period is also an integral multiple of the interval between adjacent reference pulses. Operation of this prior measurement system involves a manual adjustment of the unstable interval of the monostable multivibrator to vary the instant when a reference pulse is supplied to the bistable element to effect the desired switching. The output of the bistable element is then displayed on a meter where the envelope delay interval is indicated by the meter reading and the range is indicated by the manual adjustment of the monostable multivibrator.

Although this particular prior system yields a satisfactory measure of envelope delay, it necessarily relies upon human intervention in adjusting the system to a proper measurement range. The required use of a human operator in making delay measurements is undesirable. Indeed, in order to meet the demands of maintaining modern telephone systems most, if not all, test procedures must be fully automated and, hence, reliance on human intervention must be minimized.

A system which overcomes the limitations of prior systems is disclosed by D. L. Favin in patent application Ser. No. 197,411, filed Nov. 10, 1971. In the Favin system automatic time interval ranging is effected by selectively altering the phase of a reference pulsating signal. The reference signal is generated by supplying clock pulses to a divider circuit. Then, the reference signal is supplied to switch a bistable element from a first stable state to a second stable state. A test signal is supplied to switch the bistable element back to the first stable state. Automatic time interval ranging is achieved by inhibiting a number of clock pulses from being supplied to the divider circuit equal to the number of clock pulses occurring during the interval the bistable element is in the second state. This alters the phase of the reference signal relative to the test signal, thereby causing the bistable element to be switched from a first state to a second state and back to the first state within the interval between adjacent clock pulses.

Problems arise in such an automatic time interval ranging system when upon autoranging the residual time interval being measured is near zero duration or when a predetermined change of state of a reference signal occurs during a clock pulse. In such instances, the signals employed for SETTING and RESETTING the bistable switching element may be applied thereto out of sequence. For example, the RESET signal may be applied prior to the SET signal. Consequently, the bistable element is not switched properly. This tends to cause continuous cycling in the prior automatic ranging system, thereby yielding an erroneous, if any, time interval measurement.

SUMMARY OF THE INVENTION

These and other problems are resolved, in accordance with the inventive principles described herein, in a time interval measurement system by selectively altering the pulse width of a pulse signal representative of a prescribed reference position of a received test signal. This shifts the test pulse relative to a reference signal and eliminates uncertainity in automatic time interval ranging.

More particularly, a time interval measurement system, in accordance with the invention, includes a source of clock pulses which are selectively applied to a divider circuit for generating a reference pulsating signal. The reference pulsating signal normally has a period which is an integral multiple of the interval between adjacent clock pulses. In turn, the reference pulsating signal is supplied to a bistable switching element. The bistable element is responsive to a predetermined change of state of the reference signal to switch from a first stable state to a second stable state. A signal representative of a predetermined reference position of a received test signal is also supplied to the bistable element and causes the bistable element to switch from the second stable state back to the first stable state. By selectively controlling the phase of the reference pulsating signal relative to the test signal, the bistable switching element is caused eventually to switch from the first stable state to the second stable state and back to the first stable state within the interval between adjacent clock pulses. This is achieved by selectively inhibiting clock pulses from being supplied to the divider circuit, thereby altering the pulse width of the reference signal. The total number of clock pulses inhibited is equal to the number of clock pulses occurring during the initial interval that the bistable switching element is in the second stable state. To facilitate counting of the inhibited clock pulses and to minimize errors possible because of noise and other transient signals, in accordance with the invention, a single clock pulse is inhibited during each cycle of the reference pulsating signal until the required number is reached. Consequently, automatic time interval ranging is effected in the instant invention by altering the pulse width of the reference signal by equal increments until the necessary phase relationship between the reference and test signals is realized.

By virtue of the functioning of this circuit, the bistable element is eventually caused to switch from a first stable state to a second stable state and back to the first stable state within the interval between adjacent clock pulses. Operation of the invention in effecting this objective is commonly referred to as "automatic ranging". Once automatic ranging has occurred, the desired precise time interval measurement is obtained by counting the number of clock pulses which have been inhibited and combining the related time interval represented by those clock pulses with the residual time interval represented by the output signal generated by the bistable element.

A problem arises when a predetermined change of state of the reference pulsating signal occurs during a clock pulse. In such an instance, the reference and test signals may be applied to the bistable switching element out of proper sequence. This, in turn, causes the automatic ranging circuit to cycle continuously. This problem is overcome, in accordance with the invention, by selectively shifting the position of the test signal relative to the reference signal by a prescribed increment. In one embodiment of the invention the desired shift in the test signal is achieved by selectively altering the width of a pulse signal representative of a predetermined reference position of the test signal. When the automatic ranging system is in an uncertainty condition the bistable element is switched to the second stable state for a period which exceeds a known interval during each autoranging cycle. Accordingly, shifting of the test signal is controlled by sensing the output signal generated by the bistable switching element. When the bistable element is switched to the second stable state for more than a prescribed interval during each of a plurality of autoranging cycles, the test signal is shifted by an increment less than the interval between adjacent clock pulses. By shifting the test signal, the uncertainty region is eliminated and an accurate time interval may be made.

BRIEF DESCRIPTION OF THE DRAWING

These and other objects and advantages of the invention will be more fully understood from the following detailed description taken in accordance with the appended drawings in which.

DETAILED DESCRIPTION

Figure 1:
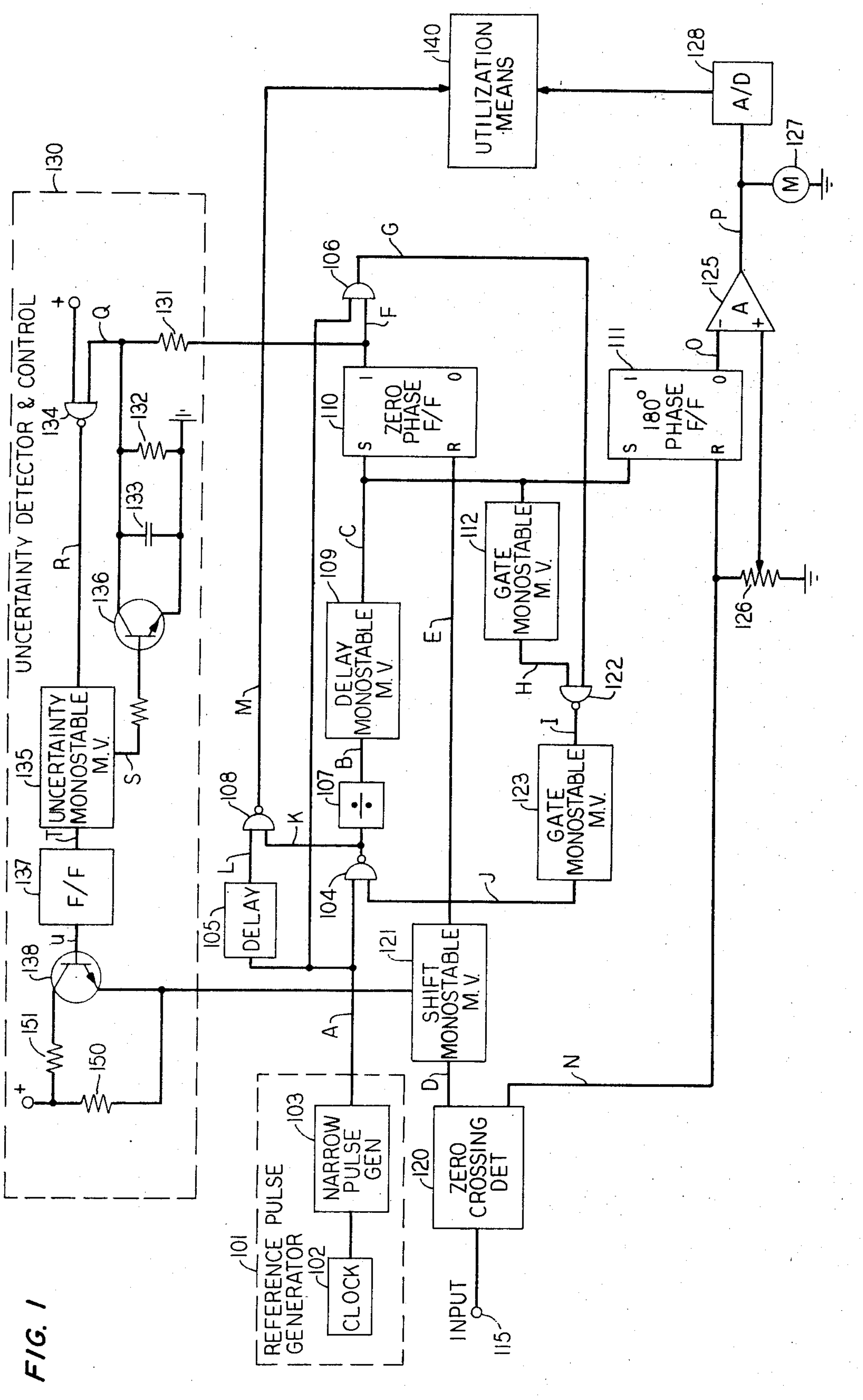
FIG. 1 shows in simplified block diagram form a time interval measurement system illustrating the invention.
Figure 2:
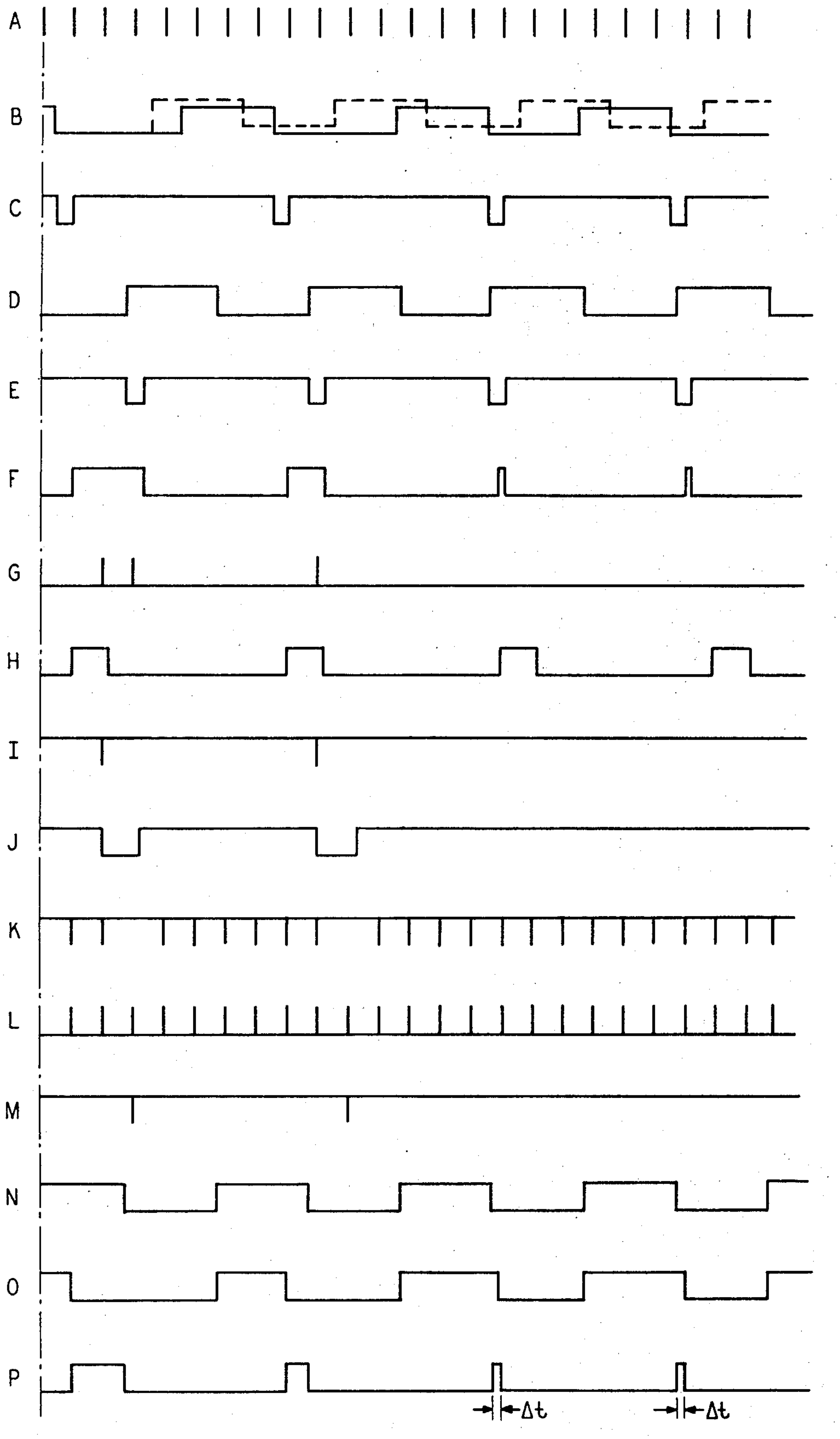
FIG. 2 depicts a series of waveforms useful in describing the system shown in FIG. 1.

FIG. 1 depicts in simplified block diagram form a system for measuring time intervals in accordance with the invention. Accordingly, reference pulse generator 101 generates pulse signals at a stable predetermined interval chosen to achieve a desired precision in measuring time intervals. Waveform A of FIG. 2 illustrates a series of such pulse signals developed at the output of pulse generator 101. In order to achieve a "high" precision in measuring time intervals, the width of each pulse developed at the output of generator 101 must be minimized. However, the pulse width must not be so narrow as to become incompatible with other circuit components utilized in practicing the invention. For example, circuit components such as flip-flops and the like may not respond to a pulse having an extremely narrow width. A narrow pulse signal having an acceptable width is generated by supplying a signal from clock 102 to narrow pulse generator 103. The frequency of the clock signal is selected to obtain a desired interval between pulses. Details of narrow pulse generator 103 are shown in FIG. 5.

Figure 5:
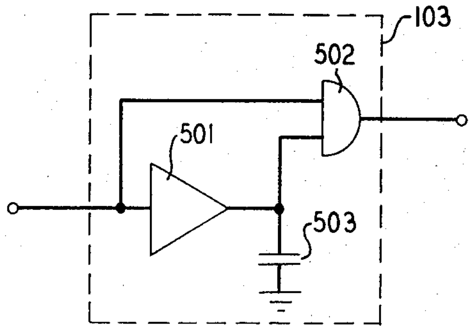
FIG. 5 depicts details of the narrow pulse generator of FIG. 1.
Figure 6:
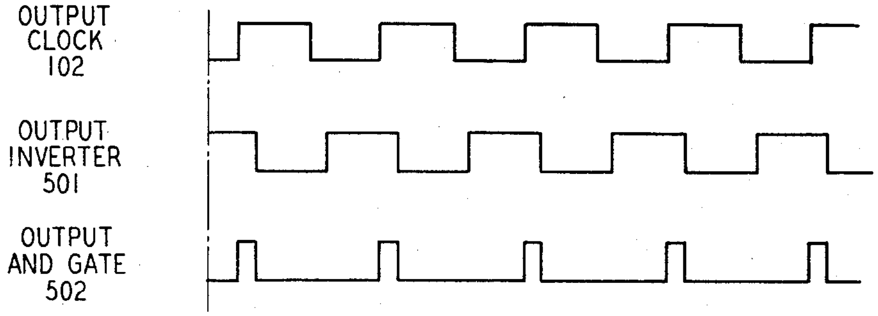
FIG. 6 shows waveforms useful in describing the operation of the narrow pulse generator of FIG. 5.

Referring briefly to FIG. 5, there is shown details of narrow pulse generator 103. Operation of pulse generator 103 is straightforward and relies primarily upon the inherent signal delay of logic circuits. For example, a symmetrical pulsating signal generated by clock 102 (FIG. 1) as shown in FIG. 6 is supplied to the input of inverter 501 and to one input of AND gate 502. As is well known in the art, the output of inverter 501 is normally high and AND gate 502 responds to high state signals simultaneously applied to both of its inputs to generate a high state signal at its output. Thus, at the instant the clock signal applied to inverter 501 and one input of AND gate 502 goes "high" (FIG. 6) the output of AND gate 502 also goes high. Inverter 501 responds to the change of state of the clock pulse to switch to a "low" state after the termination of an interval equal to the internal delay of inverter 501. Typically, this delay is approximately 10 nanoseconds. In turn, AND gate 502 responds to the change of state of the signal developed at the output of inverter 501 to switch to a low state. Consequently, the pulse signal developed at the output of AND gate 502 has a width approximately equal to the internal delay interval of inverter 501 as shown in FIG. 6. The internal delay of AND gate 502 merely shifts the position of its output pulse and does not contribute to the output pulse width. The width of the pulse generated by narrow pulse generator 103 may be increased by utilizing capacitor 503 (FIG. 5). In practice, a pulse having a duration of 30 nanoseconds is desirable. Accordingly, the component value of capacitor 503 is selected to effect an additional 20 nanosecond delay.

Returning to FIG. 1, the output of pulse generator 101, as shown in waveform A of FIG. 2, is supplied to controllable gate 104, to delay 105 and to one input of AND gate 106. Gate 104 may be any one of numerous controllable switching elements known in the art. Preferably, gate 104 is a NAND gate, which is normally activated to supply the pulse signal output of generator 101 to divider 107 and to one input of NAND gate 108.

A AND gate having its inputs connected together may be employed for delay 105.

Divider 107 is operative to generate a pulsating signal having a period which is an integral multiple of the interval between pulses supplied from generator 101. In this example, not to be construed as limiting the scope of the invention, divider 107 responds to the clock pulses, shown in waveform A of FIG. 2, to perform a 6:1 division and normally yields a signal as shown in dashed outline in waveform B of FIG. 2. The signal shown in solid outline in waveform B of FIG. 2 illustrates the output of divider 107 when automatic ranging has occurred, in accordance with the invention, and is described below.

The shift in the output from divider 107 relative to the clock pulses as shown in waveforms A and B of FIG. 2, respectively, is caused by inherent delays within divider 107. This delay interval is compensated by employing monostable multivibrator 109. Monostable multivibrator 109 responds to the negative going transition of the output signal from divider 107 to generate a pulse signal as shown in waveform C of FIG. 2. The output of monostable multivibrator 109 is supplied to the SET inputs of zero phase flip-flop 110 and 180° phase flip-flop 111 and to gate monostable multivibrator 112, respectively. The unstable interval of monostable 109 and, hence, the pulse width of the signal shown in waveform C of FIG. 2, is adjusted so that flip-flops 110 and 111 are caused to switch to a high state and a low state, respectively at an instant substantially coincident or slightly later than the occurrence of a negative transition of a clock pulse appearing at the input of AND gate 106. This arrangement improves accuracy of measurement and is also important in minimizing uncertainty in automatic ranging. That is to say, the positive going transition of the output of flip-flop 110 is aligned with a clock pulse further to assure that the circuit does not autorange continuously.

A received test signal to be measured is supplied via input terminal 115 to zero crossing detector 120. Detector 120 is responsive to the supplied test signal to generate a pulsating signal representative of reference positions of the test signal. Preferably, positions of the positive going zero crossings of the test signal are detected as shown in waveform D of FIG. 2. Detector 120 also generates a pulsating signal representative of the positions of the negative going zero crossings of the test signal as shown in waveform N of FIG. 2. That is to say, detector 120 generates signals representative of the zero phase positions and the 180° phase positions of a received test signal. Although the zero and 180° phase positions of the test signal are employed in this example any fixed phase positions may be equally employed in practicing the instant invention.

The pulsating signal representative of the zero phase positions of the test signal, as shown in waveform D of FIG. 2, is supplied to shift monostable multivibrator 121. Monostable multivibrator 121 normally has a high state output and responds to the positive going transitions of the zero phase output of detector 120 to generate a pulse signal as shown in waveform E of FIG. 2. The unstable interval of monostable 121 is alterable and is employed, in accordance with the invention, to eliminate uncertainty in automatic time interval ranging. Details concerning uncertainty elimination are discussed below.

The output from monostable 121, as shown in waveform E of FIG. 2 is supplied to the RESET input of zero phase flip-flop 110. This causes flip-flop 110 to switch from a high state to a low state. The width of the signal generated at the output of flip-flop 110 is adjusted, in accordance with the invention, to be within the interval between adjacent ones of the clock pulses generated by pulse generator 101. As stated above, operation of the invention to effect this objective is called "automatic ranging".

The output of flip-flop 110, as shown in waveform F of FIG. 2, is supplied to a second input of AND gate 106 and to uncertainty detector 130. Details and operation of uncertainty detector 130 are described below. Operation of AND gate 106 is straightforward. Gate 106 allows clock pulses to pass only when the output of flip-flop 110 is in a high state. The clock pulses which are allowed to pass, as shown in waveform G of FIG. 2, are supplied to one input of NAND gate 122. The signal generated by gate monostable multivibrator 112, as shown in waveform H of FIG. 2, is supplied to a second input of NAND gate 122. As is well known in the art, NAND gate 122 is responsive to high state signals simultaneously applied to both inputs to generate a low state signal. To this end and in accordance with the invention, the signal generated by monostable 112 has a pulse width which is adjusted so that NAND gate 122 is effective to generate only a single negative transition, as shown in waveform I of FIG. 2, during each cycle of the reference signal, as shown in waveform C of FIG. 2. In turn, the signal generated by NAND gate 122 is supplied to trigger gate monostable multivibrator 123. The output of monostable 123 is supplied to a second input of NAND gate 104. Monostable 123 responds to the output from NAND gate 122 to generate a low state signal as shown in waveform J of FIG. 2. Timing of monostable 123 is adjusted so that only a single clock pulse occurs during the unstable interval. Although incremental gating-out of the clock pulses is preferred, all of the required number of clock pulses may be gated-out during a single cycle of the pulsating signals, as described in copending application, Ser. No. 197,411, filed Nov. 10, 1971.

Accordingly, AND gate 106, monostable 112, NAND gate 122 and monostable 123 are collectively operative to generate a signal for controlling NAND gate 104 selectively to inhibit clock pulses from being supplied to divider 107. As stated above, only a single clock pulse is "gated-out", i.e., inhibited, during each cycle of the reference pulsating signal. Thus, the output of divider 107 is shifted by equal increments until the total shift is equal to an interval directly related to the number of clock pulses appearing at the output of AND gate 106 during the initial interval in which flip-flop 110 is SET and RESET. This, in addition to effecting automatic time interval ranging, in accordance with the invention, facilitates counting of the gated-out pulses and aids in minimizing the uncertainty region of operation. In the present example, only two clock pulses occurred during the initial interval in which zero phase flip-flop 110 was SET and RESET. Thus, only two clock pulses are inhibited from being supplied to divider 107, as shown in waveform K of FIG. 2, in order to effect the desired switching of flip-flop 110 during the interval between adjacent clock pulses, as shown in waveform F of FIG. 2.

Delay 105 and NAND gate 108 are employed to supply pulse signals representative of the clock pulses which have been gated-out to utilization means 140. NAND gate 108 is responsive to the output of delay 105, as shown in waveform L of FIG. 2, and to the output of NAND gate 104, as shown in waveform K of FIG. 2, to supply a number of clock pulses to utilization means 140 equal to the number of pulses gated-out, as shown in waveform M of FIG. 2. Since NAND gate 108 is made operational only when a clock pulse is gated-out possible counting errors because of noise signals are virtually eliminated. Utilization means 140 stores the gated-out pulse count, for example, by employing a counter, for later use in yielding the desired time interval measurement.

Once automatic ranging has occurred, the output signal of flip-flop 110 having a duration Δt, which represents the residual time interval, is in a steady state condition and may, if desired, be amplified, filtered and supplied to a meter to be read or to utilization means 140.

Since the duration that flip-flop 110 is in the second stable state represents a small portion of the period of operation, direct measurement is undesirable. As described in U.S. Pat. No. 3,271,666, cited above, it is advantageous to employ a second flip-flop circuit which operates about a 50 percent duty-cycle in order to minimize measurement errors. Flip-flop 111 is employed for this purpose. Accordingly, flip-flop 111 is SET via the output of monostable 109 and RESET via the 180° phase output from zero crossing detector 120. The signal developed at the zero output of flip-flop 111 is shown in waveform O of FIG. 2. The output signal from flip-flop 111 is supplied to one input of differential amplifier 125. The 180° output of zero crossing detector 120 is supplied via adjustable resistor 126 to a second input of amplifier 125. In practice, smoothing filters (not shown) are employed in each input of amplifier 125. Resistor 126 is employed as a zero adjustment for calibrating the system. Amplifier 125 is responsive to the filtered signals to generate a signal representative of the residual time interval, Δt, being measured, as shown in waveform P of FIG. 2.

The output of amplifier 125 is supplied to meter 127 and/or to analog-to-digital converter 128. The residual delay interval being measured is visually displayed on meter 127. The output of converter 128 is supplied to utilization means 140 where it is combined with the interval represented by the number of clock pulses previously supplied via NAND gate 108 to yield a measure of the total time interval. This information may then be utilized as desired. For example, the measured time interval data may be stored for future use or transmitted to a remote station for analysis.

In making measurements of time intervals which are near zero or of time intervals in which the residual time interval is near zero a region of uncertainty exists. In such instances, the system may attempt to autorange indefinitely. This tends to occur when the trailing edge of the signal generated by flip-flop 110 is coincident with a clock pulse. In such an instance the automatic ranging system may cause a clock pulse to be "gated-out" erroneously, thereby delaying SETTING of flip-flop 110 by the interval between adjacent clock pulses. Because of this delay the SET and RESET pulses are supplied to flip-flop 110 out of proper sequence. Consequently, the output of flip-flop 110 has an abnormally long pulse width. The system autoranges in an attempt to reduce the output pulse width of flip-flop 110 to be within the interval between adjacent clock pulses. As a result of autoranging a condition is again reached in which the SET and RESET signals are out-of-sequence. Consequently, the system continuously autoranges and a measurement cannot be made.

Figure 3:
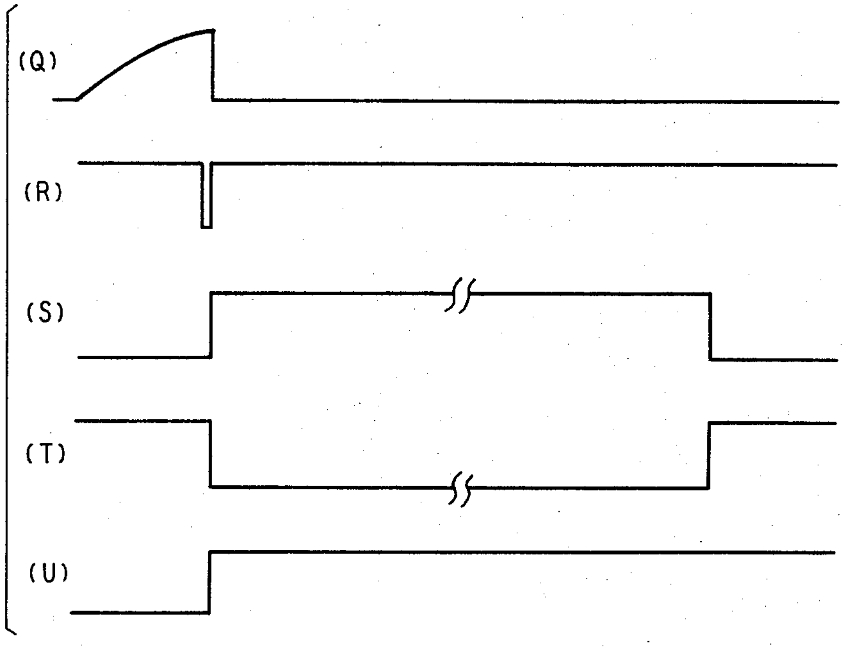
FIG. 3 shows another series of waveforms useful in describing the system of FIG. 1.

Such a condition, i.e., continuous autoranging is detected and corrected in accordance with the invention by sensing the output of flip-flop 110. Since the signal generated by flip-flop 110 has a significantly larger average value when the system is in an uncertainty region then when proper autoranging has been effected, a continuous autoranging condition is readily detectable. Accordingly, the output of flip-flop 110 is supplied to a detection circuit including resistor 131, resistor 132 and capacitor 133, and to the collector terminal of transistor 136. Transistor 136 is normally OFF. The component values of resistor 131, resistor 132 and capacitor 133 are selected to develop a potential across capacitor 133 sufficient to trigger NAND gate 134 only when the short term average value of the output from flip-flop 110 is above a prescribed value. Accordingly, the potential developed across capacitor 133, as shown in waveform Q of FIG. 3 is supplied to one input of NAND gate 134. A high state signal is supplied to the other input of NAND gate 134. When the signal developed across capacitor 133 reaches a prescribed value, a negative transition occurs at the output of NAND gate 134 as shown in waveform R of FIG. 3. The output of gate 134 is supplied to trigger uncertainty monostable multivibrator 135. One output of monostable 135 is supplied to transistor 136 while the other output of monostable 135 is supplied to flip-flop 137. The unstable interval of monostable 135 is set at a prescribed value to inhibit operation of the uncertainty detector for an interval greater than the maximum interval required for the automatic ranging circuit to recycle. Transistor 136 is employed for this purpose. Thus, transistor 136 responds to the positive output of monostable 135, as shown in waveform S of FIG. 3, to short-circuit capacitor 133 for the above prescribed interval.

Flip-flop 137 responds to the negative output of monostable 135, as shown in waveform T of FIG. 3, to generate a change of state at its output as shown in waveform U of FIG. 3. In this example, it is assumed that the output of flip-flop 137 was initially in a low state. If, however, the output of flip-flop 137 was in a high state it would have been switched to a low state.

The output of flip-flop 137 is supplied to transistor 138. Transistor 138 is operative either to connect resistor 151 in parallel with resistor 150 or to disconnect resistor 151 from being in parallel with resistor 150. Which of these conditions occurs is dependent on the initial state of flip-flop 137. In the instant example, flip-flop 137 is switched from a low state to a high state. Consequently transistor 138 is gated on and resistor 151 is connected in parallel with resistor 150.

Resistors 150 and 151 are used to control the duration of the unstable interval of shift monostable multivibrator 121. The component values of resistors 150 and 151 have been selected so that the unstable interval of monostable 121 decreases or increases by a prescribed interval when resistor 151 is connected in parallel with resistor 150 or disconnected, respectively.

Figure 4:
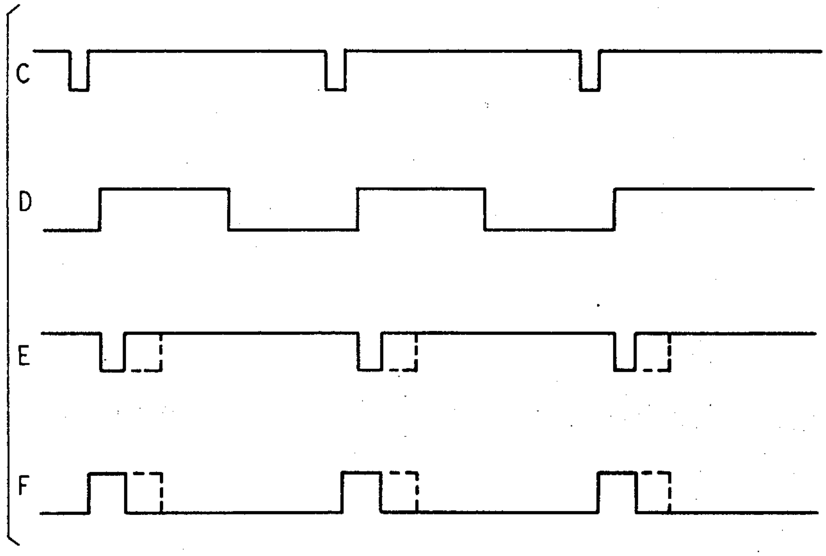
FIG. 4 illustrates still another series of waveforms used in describing the system of FIG. 1.

The shift in the test signal causes a corresponding shift in the output of flip-flop 110. Consequently, the condition which initially caused the uncertainty, namely, the coincident occurrence of the trailing edge of the output of flip-flop 110 with a clock pulse, is eliminated. This allows the automatic ranging circuit to normalize and yield the desired delay interval measurement. FIG. 4 illustrates the affect of shifting the unstable interval of monostable 121 on the test pulse (dashed outline waveform E of FIG. 4) and on the output of flip-flop 110 (dashed outline waveform F of FIG. 4).

Although the test signal supplied to RESET flip-flop 110 is shifted, measurement of the residual time interval, Δt, by flip-flop 111 (FIG. 1) is not affected. Note that the signals supplied to flip-flop 111 have not been altered but uncertainty in automatic ranging has been eliminated.

What is claimed is:

1. In a time interval measurement system, apparatus for automatic time interval ranging which comprises:

means for generating reference pulses at predetermined intervals;

means responsive to said reference pulses for generating a first pulsating signal;

means responsive to a test signal for generating a second pulse signal representative of a first reference position of said test signal;

means responsive to said first pulsating signal and said second pulse signal for generating a first control pulse signal,said first control pulse signal having a pulse width equal to the interval between the occurrence of a prescribed change of state of said first pulsating signal and said second pulse signal;

first means responsive to said first control signal for selectively altering the pulse width of said first pulsating signal so that the pulse width of said first control signal is altered to be within a prescribed interval; and second means responsive to said first control signal for selectively altering the pulse width of said second pulse signal so that said first pulsating signal and said second pulse signal are supplied to said first control signal generating means in a prescribed pulse time relationship thereby eliminating uncertainty in automatic time interval ranging.

2. The invention as defined in claim 1 wherein said second means includes means selectively responsive to said first control signal for generating a second control signal only when the average value of said first control signal exceeds a prescribed level and means responsive to said second control signal for altering the pulse width of said second pulse signal.

3. The invention as defined in claim 2 wherein said altering means includes controllable pulse generating means responsive to said second control signal for selectively altering the width of said second pulse signal.

4. The invention as defined in claim 3 wherein said second control signal generating means includes means for detecting when the average value of said first control signal is greater than said prescribed level.

5. The invention as defined in claim 4 wherein said detecting means includes an integrating circuit and means selectively responsive to the output of said integrating circuit for generating a third pulse signal only when the output of said integrating circuit exceeds a prescribed amplitude, and wherein said second control signal generating means further includes bistable switching means responsive to said third pulse signal for generating said second control signal.

6. The invention as defined in claim 5 wherein said controllable pulse generating means includes a monostable multivibrator having controllable unstable interval, said controllable multivibrator being responsive to said second control signal and to said second pulse signal for generating a version of said second pulse signal having an altered pulse width.

7. The invention as defined in claim 6 wherein said second control signal generating means further includes means responsive to said third pulse signal for disabling said integrating circuit for a prescribed interval so that said automatic ranging circuit cycles prior to the detector of another uncertainty automatic ranging condition.

8. The invention as defined in claim 1 wherein said first pulsating signal generating means includes divider means, and wherein said first means includes means for selectively sequentially inhibiting reference pulses from being supplied to said divider means until a number of reference pulses has been inhibited equal to the number of reference pulses occurring during the initial interval of said first control signal so that the pulse width of said first control signal is altered to be within a prescribed interval.

9. The invention as defined in claim 8 wherein said inhibiting means includes controllable switching means and means selectively responsive to said first control signal, said reference pulses and said first pulsating signal for generating a third control signal for selectively disabling said switching means to inhibit sequentially said reference pulses from being supplied to said divider means.

10. In a time interval measurement system of the automatic time interval ranging type including a bistable switching element which is responsive to a reference pulsating signal and to a test pulse signal representative of a prescribed reference position of a test signal for yielding a measure of the time interval between the occurrence of a predetermined change of state of said reference pulsating signal and said test pulse signal and wherein the pulse width of said reference signal is selectively altered to effect automatic time interval ranging, the improvement which comprises;

means selectively responsive to a first control pulse signal generated by said bistable switching element for selectively altering the pulse width of said test pulse signal so that said reference pulsating signal and said test pulse signal are supplied to said bistable element in a prescribed pulse time relationship thereby eliminating uncertainty in automatic time interval ranging.

11. The invention as defined in claim 10 wherein said altering means includes means responsive to said first control signal for generating a second control signal only when the average value of said first control signal exceeds a prescribed level and controllable pulse generating means responsive to said second control signal for altering the width of said test pulse signal.

12. The invention as defined in claim 11 wherein said second control signal generating means includes an integrating circuit for detecting when the average value of said first control signal exceeds said prescribed level and means in circuit relationship with said integrating circuit for generating said second control signal, and wherein said controllable pulse generating means includes a monostable multivibrator having an adjustable unstable interval, said adjustable multivibrator being responsive to said second control signal and said test pulse signal for generating a version of said test pulse signal having an altered pulse width.

* * * * *